(12) United States Patent
Chlystek et al.

(10) Patent No.: US 11,054,032 B2
(45) Date of Patent: Jul. 6, 2021

(54) LIGHT WEIGHT HOLE PLUG

(71) Applicant: ILLINOIS TOOL WORKS INC., Glenview, IL (US)

(72) Inventors: Thomas Michael Chlystek, Darien, IL (US); Tao Wang, Yokosuka Kanagawa (JP); George Siragusa, Chicago Heights, IL (US); Gregory Mamelson, Saint John, IN (US)

(73) Assignee: Illinois Tool Works Inc., Glenview, IL (US)

( * ) Notice: Subject to any disclaimer, the term of this patent is extended or adjusted under 35 U.S.C. 154(b) by 197 days.

(21) Appl. No.: 16/227,937

(22) Filed: Dec. 20, 2018

(65) Prior Publication Data

US 2019/0211929 A1 Jul. 11, 2019

Related U.S. Application Data

(60) Provisional application No. 62/616,006, filed on Jan. 11, 2018.

(51) Int. Cl.
*F16B 19/00* (2006.01)
*F16J 13/14* (2006.01)
*F16J 13/02* (2006.01)

(52) U.S. Cl.
CPC ............... *F16J 13/14* (2013.01); *F16J 13/02* (2013.01)

(58) Field of Classification Search
CPC .................................. F16B 13/14; F16B 13/02
USPC .......................................... 220/780, DIG. 19
See application file for complete search history.

(56) References Cited

U.S. PATENT DOCUMENTS

| 2,758,498 | A | * | 8/1956 | Johnson | F16B 21/086 |
| | | | | | 411/508 |
| 4,583,654 | A | * | 4/1986 | Pufpaff | B65D 39/04 |
| | | | | | 215/355 |
| 4,952,106 | A | * | 8/1990 | Kubogochi | F16B 19/1081 |
| | | | | | 411/48 |
| 5,448,809 | A | * | 9/1995 | Kraus | F16B 21/02 |
| | | | | | 24/453 |
| 5,702,133 | A | * | 12/1997 | Pavur | B60R 13/0206 |
| | | | | | 220/789 |
| 5,893,480 | A | * | 4/1999 | Dore | B62D 25/24 |
| | | | | | 215/355 |
| 6,319,436 | B1 | * | 11/2001 | Jaeger | B29C 44/0461 |
| | | | | | 264/255 |
| 7,757,997 | B2 | * | 7/2010 | Smutny | F16B 21/086 |
| | | | | | 248/71 |
| 8,469,646 | B2 | * | 6/2013 | Kono | F16B 21/086 |
| | | | | | 411/508 |

(Continued)

FOREIGN PATENT DOCUMENTS

DE         10303366 A1    8/2004
DE    102016010124 A1    2/2018
(Continued)

*Primary Examiner* — Gary W Estremsky
(74) *Attorney, Agent, or Firm* — Quarles & Brady LLP

(57) ABSTRACT

A hole plug includes a cap and a securing frame. The securing frame extends from the cap. The securing frame includes first and second support legs, first and second connectors, and a lock body. The first connector is engaged with the first support leg. The second connector is engaged with the second support leg. The lock body is engaged with the first and second connectors.

15 Claims, 6 Drawing Sheets

(56) References Cited

U.S. PATENT DOCUMENTS

| | | | | |
|---|---|---|---|---|
| 8,695,177 B2* | 4/2014 | Kato | ............... | F16B 21/065 |
| | | | | 24/297 |
| 8,776,326 B2* | 7/2014 | Clarke | ............. | F16B 21/186 |
| | | | | 24/297 |
| 9,676,425 B2 | 6/2017 | Kanie et al. | | |
| 9,873,388 B2* | 1/2018 | Meyers | ............. | B60R 13/0206 |
| 2012/0308333 A1* | 12/2012 | Hirakawa | ............. | F16B 21/086 |
| | | | | 411/508 |
| 2014/0311038 A1* | 10/2014 | Iwahara | ............. | B62D 25/24 |
| | | | | 49/466 |
| 2016/0068314 A1 | 3/2016 | Jatzke et al. | | |

FOREIGN PATENT DOCUMENTS

| | | |
|---|---|---|
| EP | 0911132 A2 | 4/1999 |
| EP | 3061675 A1 | 8/2016 |

* cited by examiner

US 11,054,032 B2

LIGHT WEIGHT HOLE PLUG

RELATED APPLICATION

This application claims the benefit of U.S. Provisional Application No. 62/616,006 filed on Jan. 11, 2018, which is incorporated herein by reference in its entirety.

FIELD OF THE DISCLOSURE

This disclosure relates generally to hole plugs, and, more particularly, to hole plugs that are light weight and robust.

BACKGROUND

Various assemblies include panels, blocks, or other such components connected to one another. Automobile assemblies, for example, include various panels and structures connected to other panels or structures, or to an automobile frame.

Certain components, such as blocks and panels, have holes formed therein. During an assembly process, the holes may receive and retain fasteners, or allow tubing, wiring, or the like to pass therethrough. In some instances, however, a hole may not be utilized. Similarly, in some instances, the hole may be reserved for a future application.

Hole plugs are often used to securely cover and close holes formed within panels of a device. A typical hole plug is formed of a resilient material, such as rubber, that allows the hole plug to fit tightly in the hole.

Certain known hole plugs are typically sized and shaped to fit into a specific size hole, and are not tunable. That is, certain known hole plugs are typically not configured to be modified. Further, when inserted into holes, certain known hole plugs may be susceptible to inadvertent removal from the holes. Additionally certain known hole plugs use overly large amounts of material to plug a hole. This excess material increases the cost of the known hole plugs. Further, when the known hole plugs are used in an automotive application, the excess material has a negative effect on vehicle fuel economy.

Therefore, a need exists for a lighter hole plug. Further, a need exists for a hole plug that may be adapted and modified. Additionally, a need exists for a hole plug that remains securely locked into a hole.

SUMMARY

In one aspect, a hole plug is disclosed, which includes a cap and a securing frame. The securing frame extends from the cap. The securing frame includes first and second support legs, first and second connectors, and a lock body. The first connector is engaged with the first support leg. The second connector is engaged with the second support leg. The lock body is engaged with the first and second connectors.

In a different aspect, another hole plug is disclosed, which includes a cap and a securing frame. The securing frame extends from the cap. The securing frame includes a support leg, a connector, and a lock body. The connector is engaged with the support leg. The lock body is engaged with the connector. The lock body includes a plurality of teeth and a stopper leg.

In yet another aspect, another hole plug is disclosed, which includes a cap, an arcuate support leg, an arcuate connector, and a lock body. The arcuate support leg extends from the cap. The arcuate connector extends from the arcuate support leg. The lock body is engaged with the arcuate connector. The lock body includes an inwardly extending stopper leg.

DETAILED DESCRIPTION

As explained herein, the present disclosure provides a hole plug that is comparatively lighter in weight and uses less material than known hole plugs. The hole plug exhibits a low insertion force and includes a locking feature that provides the hole plug with high extraction force. As non-limiting examples, the hole plug may have a diameter between and including 15 mm to 51 mm. Optionally, the hole plug may be sized and shaped to have a diameter that is less than 15 mm, or greater than 51 mm. The hole plug may also fill an oval shape instead of or in addition to a round hole diameter.

Figure 1:
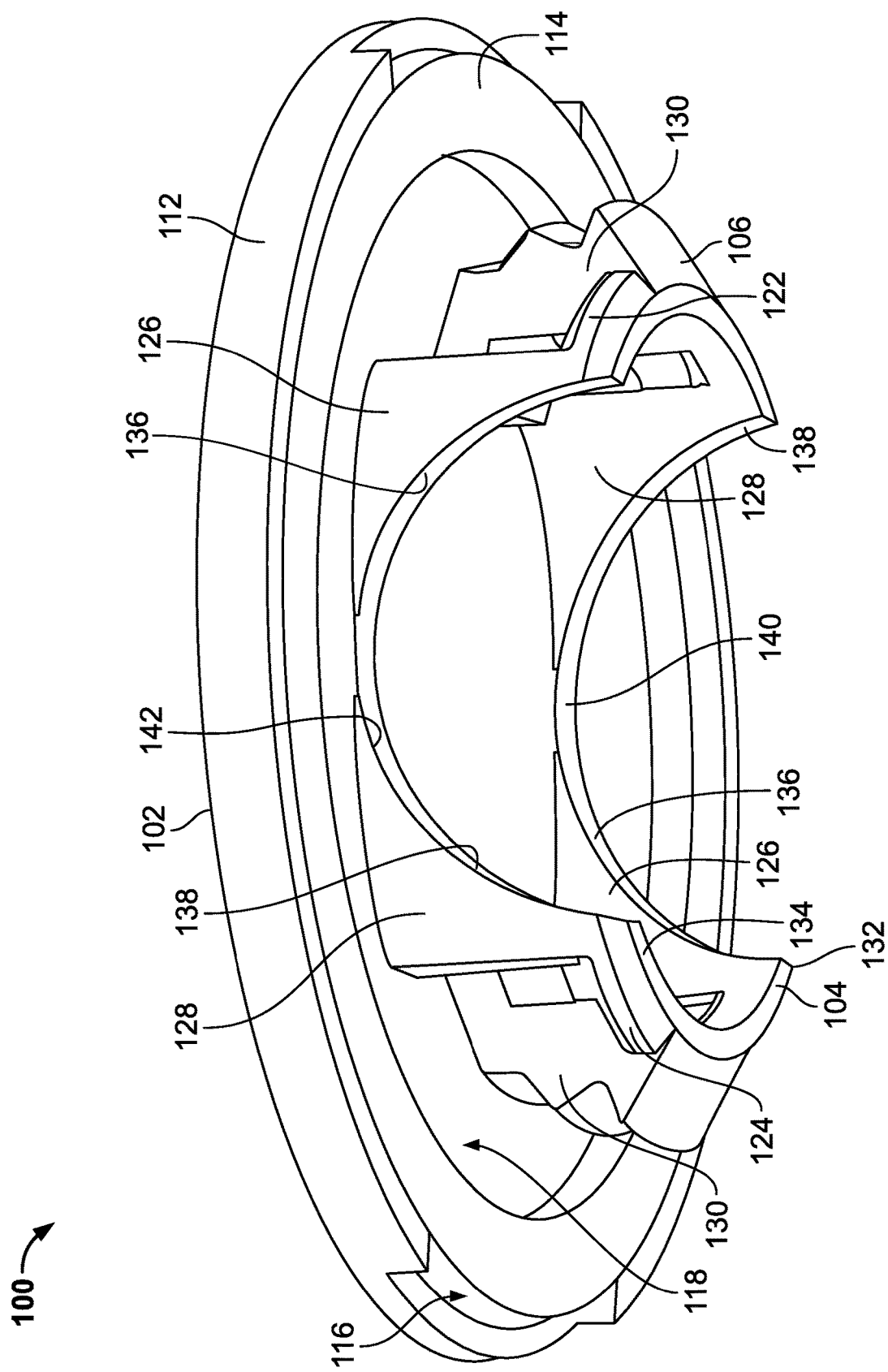
FIG. 1 is an isometric view of an example hole plug, according to one exemplary embodiment.
Figure 2:
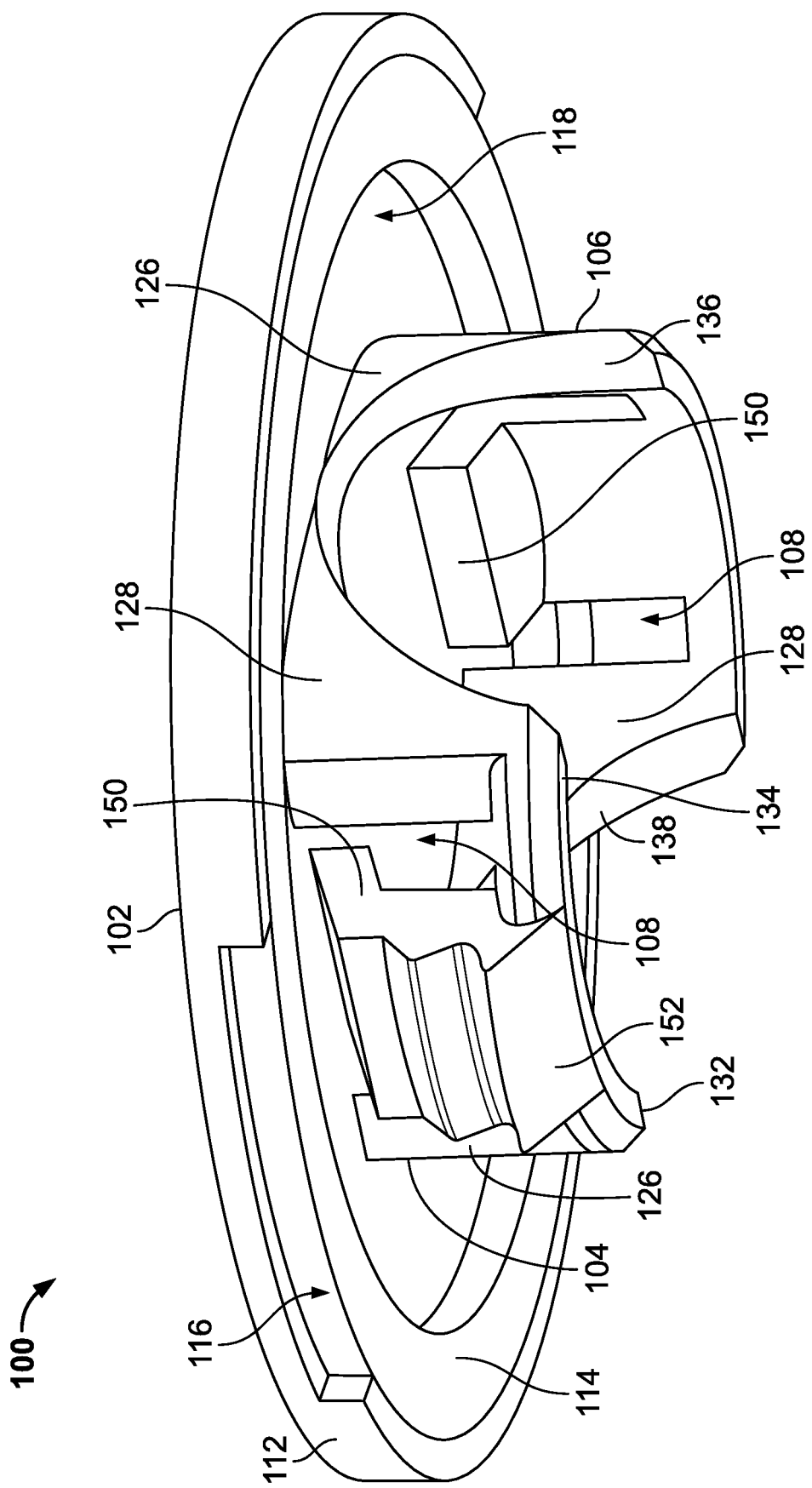
FIG. 2 is another isometric view of the hole plug of FIG. 1.
Figure 3:
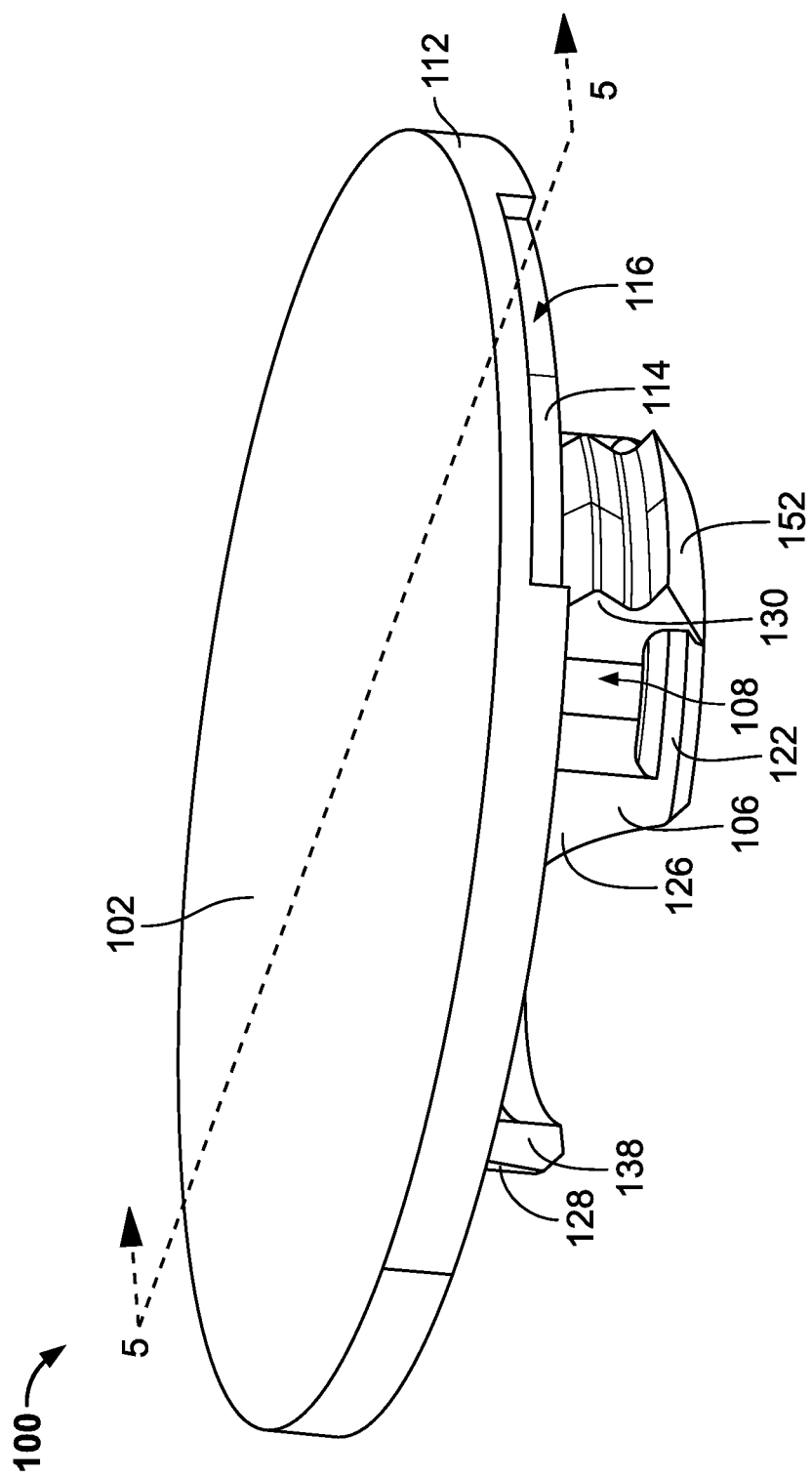
FIG. 3 is a further isometric view of the hole plug of FIGS. 1 and 2.

As shown in FIGS. 1-6, the hole plug 100 includes a cap 102 and first and second securing frames 104, 106. The first and second securing frames 104, 106 extend outwardly from the cap 102. It should be understood that the first and second securing frames 104, 106 are substantially identical. Thus, each feature described in greater detail below with respect to the first securing frame 104 is also included in the second securing frame 106. As shown FIGS. 1-3, the first securing frame 104 is not a contiguous wall. Instead, as best shown in FIG. 2, the first securing frame 104 defines an opening 108 that reduces the overall weight of the hole plug 100.

Figure 5:
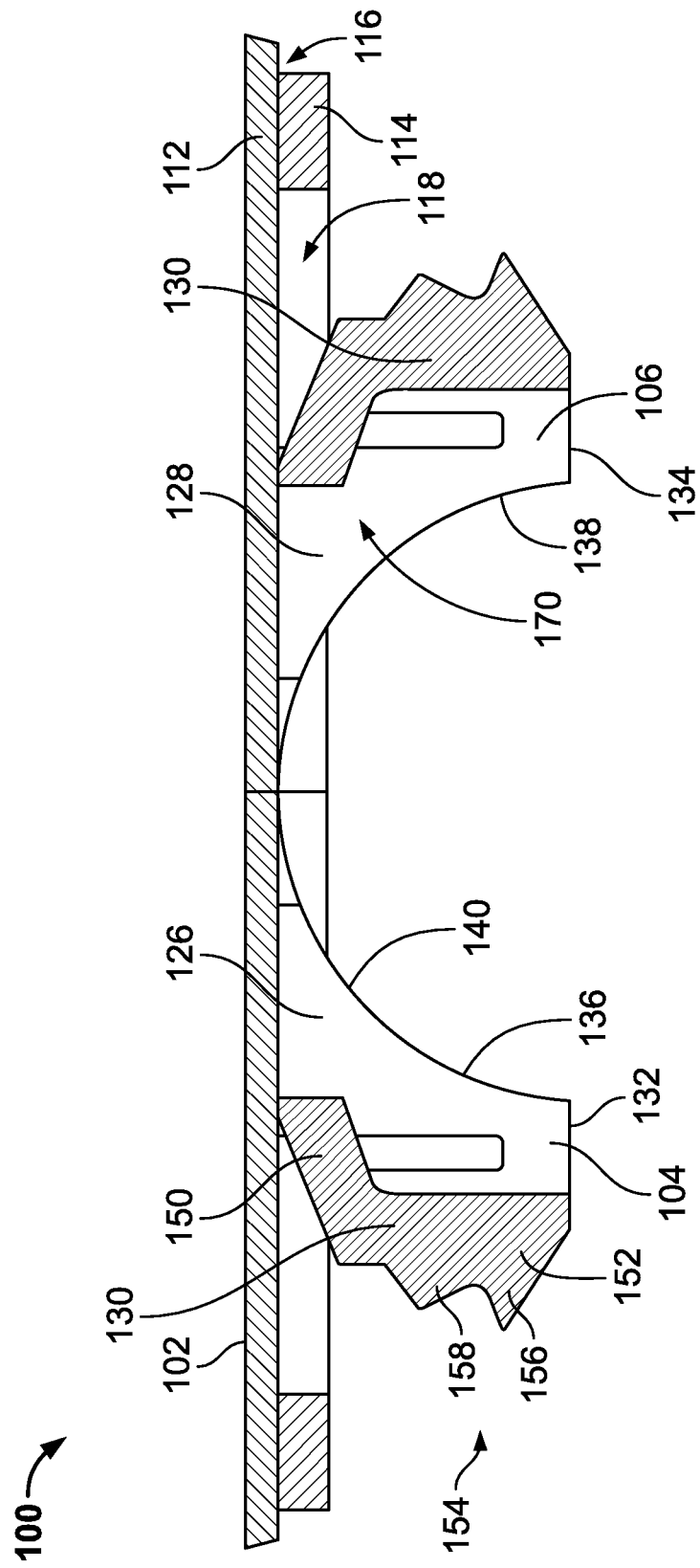
FIG. 5 is a cross-sectional view of the hole plug of FIGS. 1-3, taken along the line 5-5 of FIG. 3.

With particular reference to FIGS. 1 and 5, the cap 102 includes an upper body 112 and a ring portion 114. The ring portion 114 is retained in the upper body 112 to define a pry cavity 116 and a well 118. It should be understood that a tool may be inserted into the pry cavity 116 to remove the hole plug 100 from a panel 120 (see FIG. 6).

With reference to FIGS. 1, 2, and 5, the first and second securing frames 104, 106 are partially disposed in the well 118 and extend from the upper body 112. The first securing frame 104 includes first and second connectors 122, 124 (see FIG. 4), first and second support legs 126, 128 (see FIGS. 1 and 2), and a lock body 130. The lock body 130 is centrally located in the first securing frame 104. The first and second connectors 122, 124 have first ends coupled to opposite ends of the lock body 130. The first and second connectors 122, 124 additionally have second ends coupled to the first and second support legs 126, 128. The first and second securing frames 104, 106 are arcuate. Thus, the first and second connectors 122, 124, the first and second support legs 126, 128, and portions of the lock body 130 are arcuate. The first and second support legs 126, 128 connect to and extend from the upper body 112 of the cap 102. The first and second support legs 126, 128 are mirror images of one another and respectively have first and second lower ends 132, 134 and first and second inwardly-facing arcuate surfaces 136, 138.

With particular reference to FIG. 1, the first support leg 126 of the first securing frame 104 opposes and couples to the second support leg 128 of the second securing frame 106. Thus, the first support leg 126 of the first securing frame 104 and the second support leg 128 of the second securing frame 106 define a first arch 140. More specifically, the first inwardly-facing arcuate surface 136 of the first securing frame 104 joins the second inwardly-facing arcuate surface 138 of the second securing frame 106 to form the first arch 140.

Further, the second support leg 128 of the first securing frame 104 opposes and couples to the first support leg 126 of the second securing frame 106. Thus, the second support leg 128 of the first securing frame 104 and the first support leg 126 of the second securing frame 106 define a second arch 142. More specifically, the second inwardly-facing arcuate surface 138 of the first securing frame 104 joins the first inwardly-facing arcuate surface 136 of the second securing frame 106 to form the second arch 142.

As shown in FIG. 1, the first and second arches 140, 142 oppose one another. Thus, the first and second securing frames 104, 106 do not form a contiguous wall. The first and second arches 140, 142 provide a strong and robust support structure. The respective radii of the first and second arches 140, 142 may be varied to adjust a desired extraction force of the hole plug 100 from an opening 146 in the panel 120 (see FIG. 6).

With particular reference to FIG. 5, the lock body 130 includes a stopper leg 150, an insertion taper 152, and a plurality of teeth 154 between the stopper leg 150 and the insertion taper 152. The plurality of teeth 154 extends outwardly from the lock body 130 and includes first and second teeth 156, 158, although any suitable number of teeth may be utilized. The first and second teeth 156, 158 are graduated with respect to one another. In other words, the first tooth 156 extends farther outwardly from the lock body 130 than the second tooth 158. The stopper leg 150 extends inwardly and upwardly toward the upper body 112 of the cap 102. The insertion taper 152 is opposite the stopper leg 150 and is connected to and transitions into the first tooth 156.

Figure 6:
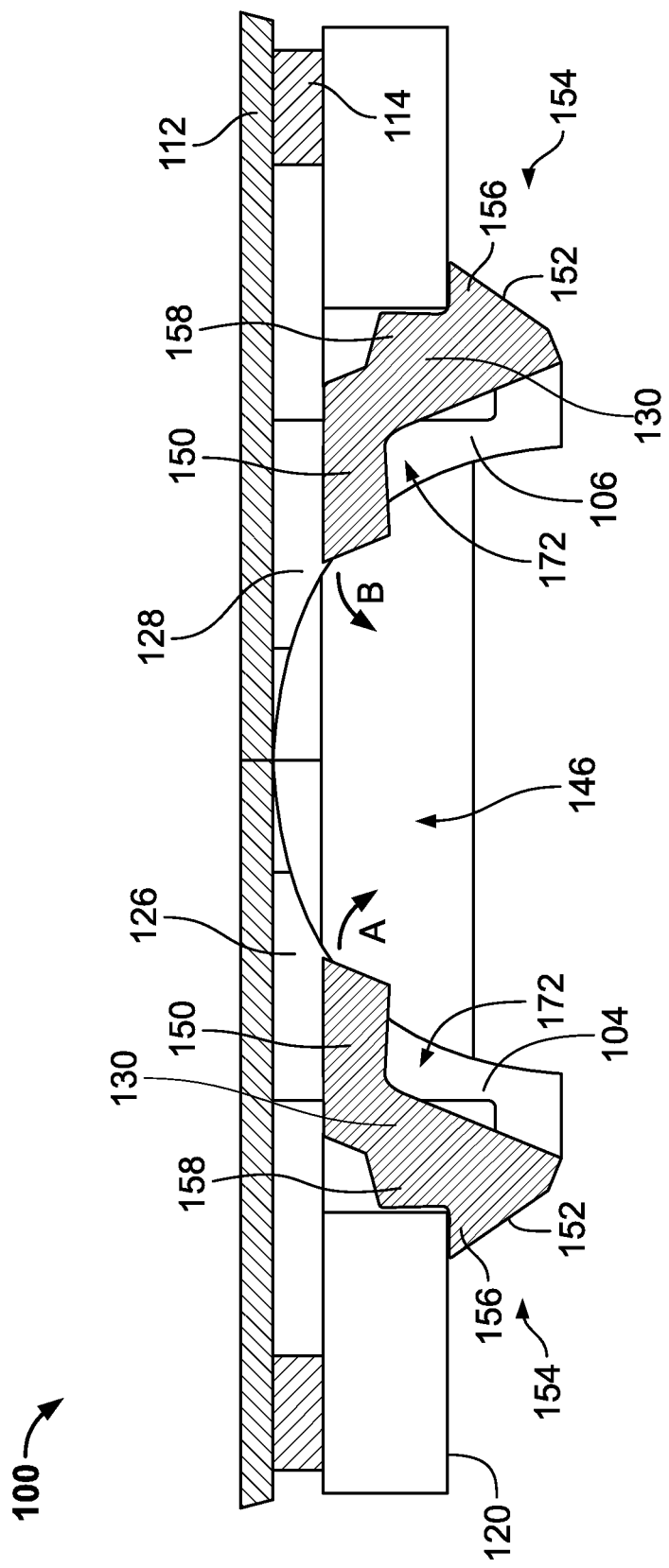
FIG. 6 is a cross-sectional view of the hole plug of FIG. 5 as installed in a panel.

Looking at FIG. 6, the plurality of teeth 154 are configured to lock onto portions of the panel 120 defining the opening 146. Additionally, referring to FIGS. 1-4, because the lock body 130 is arcuate, the plurality of teeth 154 are also arcuate.

Figure 4:
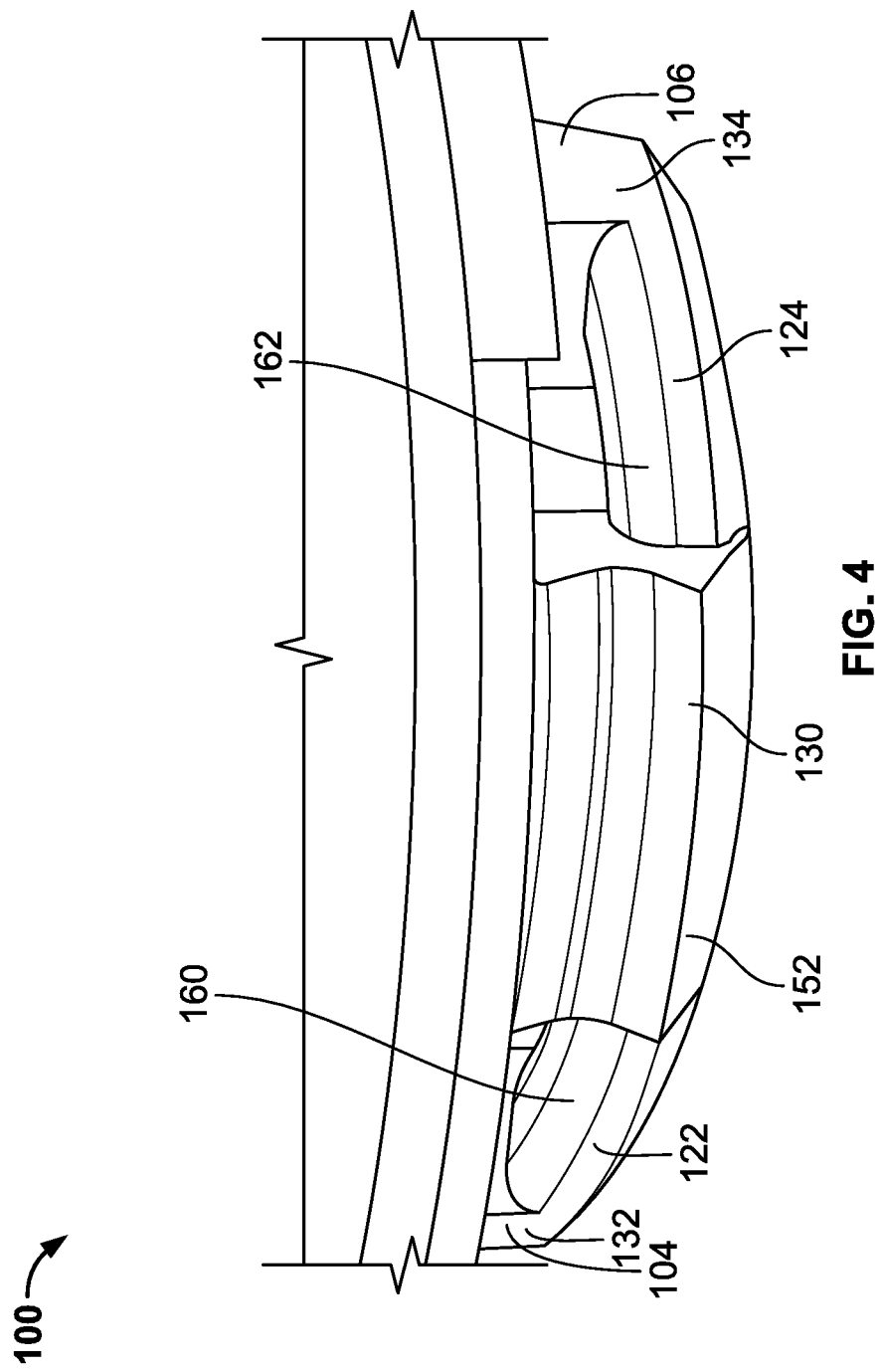
FIG. 4 is an enlarged isometric view of connectors of the hole plug of FIGS. 1-3.

With particular reference to FIG. 4, the first connector 122 has a first upper radius 160 and the second connector 124 has a second upper radius 162. The first connector 122 connects the first lower end 132 of the first support leg 126 to the lock body 130. Similarly, the second connector 124 connects the second lower end 134 of the second support leg 128 to the lock body 130. More specifically, the first and second connectors 122, 124 connect the first and second lower ends 132, 134 to the insertion taper 152.

In operation, the first and second connectors 122, 124 act as torsional springs to urge the stopper leg 150 toward the cap 102. Thus, the first connector 122 has a first spring constant and the second connector 124 has a second spring constant. In other words, the lock body 130 is spring-loadedly rotatable relative to the first and second support legs 126, 128 via the first and second connectors 122, 124.

With particular reference to FIG. 5, the lock body 130 is shown in a relaxed position 170. In the relaxed position 170, the first and second connectors 122, 124 are unloaded and the stopper leg 150 contacts the upper body 112 of the cap 102. Thus, thus stopper leg 150 contacts the upper body 112 of the cap 102 to prevent outward rotation of the lock body 130 past the relaxed position 170. In other words, the lock body 130 is prevented from rotating outwardly from the relaxed position 170 by the stopper leg 150 contacting the cap 102.

Looking particularly at FIG. 6, the lock bodies 130 of the first and second securing frames 104, 106 are shown in a loaded position 172. In the loaded position 172, the lock body 130 of the first securing frame 104 is rotated in a first direction A about the first and second connectors 122, 124. Similarly, in the loaded position 172, the lock body 130 of the second securing frame 106 is rotated in a second direction B about the first and second connectors 122, 124. In the illustrated embodiment, the first and second directions A, B are generally opposite. In other words, in the loaded position 172, the lock body 130 of the first securing frame 104 is rotated inwardly relative to the first securing frame 104 and the lock body 130 of the second securing frame 106 is rotated inwardly relative to the second securing frame 106. In yet other words, in the loaded position 172, the lock bodies 130 of the first and second securing frames 104, 106 are rotated toward one another about their respective first and second connectors 122, 124. This rotation of the lock bodies 130 twists the first and second connectors 122, 124. Thus, the stopper legs 150 are distanced away from the cap 102 and the first and second connectors 122, 124 are torsionally loaded to urge the plurality of teeth 154 against the panel 120. Thus, the lock body 130 may rotate between the relaxed position 170 of FIG. 5 and the loaded position 172 of FIG. 6.

Looking again at FIG. 4, it should be understood that the first spring constant of the first connector 122 is related to the first upper radius 160. Further, the second spring constant of the second connector 124 is related to the second upper radius 162. In some examples, the first and second spring constants are respectively proportional to the first and second radii 160, 162. Thus, the insertion and extraction forces of the hole plug 100 into and out of the opening 146 are related to the first and second radii 160, 162. In other words, the first and second radii 160, 162 may be configured to produce a desired insertion force and/or a desired extraction force.

With particular reference to FIG. 6, in operation, to secure the hole plug 100 into the opening 146 of the panel 120, the hole plug 100 is aligned with a center of the opening 146, and pressed into the opening 146 by hand or machine. As the hole plug 100 is pressed into the hole, one or more audible and/or tactile clicks are emitted by one or more of the plurality of teeth 154 as the hole plug 100 is snapably coupled to a portion of the panel 120, thereby providing positive feedback that the hole plug 100 is secured in the opening 146. When the hole plug 100 is seated in the opening 146, the ring portion 114 contacts an outer portion the panel 120. In some embodiments, the ring portion 114 is coated with adhesive to adhesively engage with the panel 120.

The force to insert the hole plug 100 into the opening 146, i.e., that is, the insertion force, is relatively low compared to certain known hole plugs. The insertion force is low due to there being less material in the first and second securing frames 104, 106, in contrast with a contiguous circumferential wall.

In order to form the hole plug 100, only two slides in a forming tool are needed, in contrast with the four slides needed to form most known hole plugs. Further, the hole plug 100 is relatively thin compared to certain known hole plugs, thereby allowing for faster cycle times in a forming mold. In fact, it has been found that the hole plug 100 is at least 40% lighter than certain known hole plugs, while providing the same or increased plugging performance.

From the foregoing, it will be appreciated that the above disclosed light weight hole plug 100 reduces overall material and may thus aid in reducing associated manufacturing costs and aid in increasing fuel economy in a vehicle. Further, because the insertion force of the hole plug 100 may be tuned by adjusting the first and second upper radii 160, 162 of the first and second connectors 122, 124 during manufacture, the hole plug 100 may be used across a wide range of panel materials and applications. Additionally, because the lock body 130 and stopper leg 150 features significantly increase extraction force of the hole plug 100, loss of the hole plug 100 may be prevented. The light weight hole plug 100 may thus aid in improving the aerodynamics of a vehicle and thereby increase the fuel economy of the vehicle.

It has been found that while certain known hole plugs may be used with panels having a thickness of 0.6 mm to 2.3 mm, the hole plug 100 of the present disclosure may be used with panels having thicknesses of 0.6 mm to 3.0 mm, for example, thereby providing an increase of 0.7 mm in range (i.e., 30% more).

While various spatial and directional terms, such as top, bottom, lower, mid, lateral, horizontal, vertical, front and the like may be used to describe examples of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the examples disclosed and defined herein extend to all alternative combinations of two or more of the individual features mentioned or evident from the text and/or drawings. All of these different combinations constitute various alternative aspects of the present disclosure. The examples described herein explain the best modes known for practicing the disclosure and will enable others skilled in the art to utilize the disclosure. The claims are to be construed to include alternative examples to the extent permitted by the prior art.

What is claimed is:

1. A hole plug, comprising:
   a cap; and
   a securing frame extending from the cap, wherein the securing frame comprises:
   a first support leg,
   a second support leg,
   a first connector engaged with the first support leg,
   a second connector engaged with the second support leg, and
   a lock body engaged with the first and second connectors,
   wherein the lock body comprises a stopper leg that extends inwardly and upwardly toward the cap, and
   wherein the stopper leg selectively contacts the cap.

2. The hole plug of claim 1, wherein the securing frame is a first securing frame and further comprising a second securing frame, the first and second securing frames defining an arch.

3. The hole plug of claim 2, wherein the second securing frame is opposite the first securing frame, the arch is a first arch, and the first and second securing frames define a second arch opposite the first arch.

4. The hole plug of claim 1, wherein the lock body comprises a tooth to engage an opening in a panel.

5. The hole plug of claim 1, wherein when the stopper leg contacts the cap, the stopper leg prevents outward rotation of the lock body relative to the first and second support legs.

6. The hole plug of claim 1, wherein the lock body is rotatable relative to the first and second support legs via the first and second connectors.

7. The hole plug of claim 6, wherein the first connector and the second connector act as torsional springs, and wherein the first connector has a first spring constant and the second connector has a second spring constant.

8. The hole plug of claim 7, wherein the first connector has a first upper radius and the second connector has a second upper radius, and wherein the first spring constant is related to the first upper radius and the second spring constant is related to the second upper radius.

9. The hole plug of claim 1, wherein the cap and the securing frame define an opening.

10. The hole plug of claim 1, wherein the lock body comprises an insertion taper.

11. A hole plug,
    comprising:
    a cap;
    an arcuate support leg extending from the cap;
    an arcuate connector extending from the arcuate support leg; and
    a lock body engaged with the arcuate connector, the lock body comprising an inwardly extending stopper leg.

12. The hole plug of claim 11, wherein the lock body further comprises an outwardly extending tooth.

13. The hole plug of claim 12, wherein the lock body further comprises an insertion taper connected to the outwardly extending tooth and opposite the stopper leg.

14. A hole plug, comprising:
    a cap; and
    a first securing frame extending from the cap, wherein the first securing frame
    comprises:
    a first support leg,
    a second support leg,
    a first connector engaged with the first support leg,
    a second connector engaged with the second support leg, and
    a lock body engaged with the first and second connectors,
    wherein the lock body comprises a stopper leg that extends inwardly and upwardly toward the cap, and
    further comprising a second securing frame, the first and second securing frames defining an arch.

15. The hole plug of claim 14, wherein the second securing frame is opposite the first securing frame, the arch is a first arch, and the first and second securing frames define a second arch opposite the first arch.

* * * * *